(12) United States Patent
Klappert et al.

(10) Patent No.: US 9,762,945 B2
(45) Date of Patent: Sep. 12, 2017

(54) METHODS AND SYSTEMS FOR RECOMMENDING A DISPLAY DEVICE FOR MEDIA CONSUMPTION

(71) Applicant: Rovi Guides, Inc., Santa Clara, CA (US)

(72) Inventors: Walter R. Klappert, Los Angeles, CA (US); Michael R. Nichols, La Canada Flintridge, CA (US); Sean William Rosqvist, Kaysville, UT (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/716,576

(22) Filed: May 19, 2015

(65) Prior Publication Data
US 2016/0345044 A1 Nov. 24, 2016

(51) Int. Cl.
| | |
|---|---|
| H04N 7/16 | (2011.01) |
| H04N 21/414 | (2011.01) |
| H04N 21/442 | (2011.01) |
| H04N 21/45 | (2011.01) |
| H04N 21/41 | (2011.01) |
| H04N 21/458 | (2011.01) |
| H04N 21/488 | (2011.01) |

(52) U.S. Cl.
CPC ... *H04N 21/41415* (2013.01); *H04N 21/4126* (2013.01); *H04N 21/44218* (2013.01); *H04N 21/458* (2013.01); *H04N 21/4532* (2013.01); *H04N 21/4882* (2013.01)

(58) Field of Classification Search
CPC ..... H04N 21/45; H04N 21/441; H04N 21/632
USPC ....................................................... 725/10, 16
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,538,814 B2 | 9/2013 | Chang et al. |
| 8,543,455 B2 | 9/2013 | Damera-Venkata et al. |

(Continued)

OTHER PUBLICATIONS

Minority Report, Jun. 17, 2002, Twentieth Century Fox Film Corporation, USA, accessible at https://www.youtube.com/watch?v=OKFP1ZKKEI8 (last accessed May 15, 2015).

*Primary Examiner* — Brian T Pendleton
*Assistant Examiner* — Alan Luong
(74) *Attorney, Agent, or Firm* — Haley Guiliano LLP

(57) ABSTRACT

Systems and methods are described herein for recommending a display device for media consumption. The location and media content preference of the user is determined and used to recommend the location of a display device that is currently displaying content relevant to the user. For example, if a user walks into a restaurant and indicates that he wishes to watch one of the televisions, he is directed to a television at the far side of the room which is already playing the sports (e.g., basketball) game with his favorite team. This helps ensure that users are able to find and consume content that is meaningful to them in public spaces.

18 Claims, 7 Drawing Sheets

(56) References Cited

U.S. PATENT DOCUMENTS

| | | | |
|---|---|---|---|
| 2002/0144273 A1* | 10/2002 | Reto | H04L 29/06027 |
| | | | 725/86 |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2009/0265737 A1* | 10/2009 | Issa | G06F 17/30817 |
| | | | 725/38 |
| 2010/0153885 A1* | 6/2010 | Yates | G06F 3/0482 |
| | | | 715/841 |
| 2011/0069940 A1* | 3/2011 | Shimy | G11B 27/105 |
| | | | 386/296 |
| 2012/0060176 A1* | 3/2012 | Chai | H04H 60/45 |
| | | | 725/10 |
| 2014/0229968 A1* | 8/2014 | Francisco | H04N 21/441 |
| | | | 725/16 |
| 2014/0359647 A1* | 12/2014 | Shoemake | H04N 5/23206 |
| | | | 725/10 |
| 2015/0143409 A1* | 5/2015 | Maughan | H04N 21/262 |
| | | | 725/34 |
| 2016/0073143 A1 | 3/2016 | Filev | |
| 2016/0182930 A1* | 6/2016 | Ortiz | G06K 9/00758 |
| | | | 725/25 |

* cited by examiner

600

METHODS AND SYSTEMS FOR RECOMMENDING A DISPLAY DEVICE FOR MEDIA CONSUMPTION

BACKGROUND

Determining meaningful media content to display on public display devices that will satisfy all of the viewers is a difficult task. Often, different users have very different preferences, and while there are multiple display device options, there is no way to determine the optimal arrangement of users, media content, and display devices. For example, in a restaurant where there are a limited number of televisions, there is no way to determine which televisions should be allocated to news or sports to best fit the crowd beyond asking each of the users in the restaurant.

Determining the media content to display on a public display for a plurality of users with a wide range of interests requires knowing the preferences of each user. Often, there is no way of determining the preferences of each user in a space, as the users enter and leave the space, to ensure that the displayed content remains relevant to the plurality of users within view of the display device. For example, in a public square in which there are a number of billboards and a crowd with varied interests, there is no way to match the content on the billboards to the interests and preferences of the crowd.

SUMMARY

Systems and methods are described herein for coordinating the display of media content on communal display devices. For example, if a user walks into a restaurant and indicates that he wishes to watch one of the televisions, he is directed to a television at the far side of the room which is already playing the sports game with his favorite team. In another example, if a significant number of the users in the restaurant have a preference for watching a news station (e.g., CNN), one of the televisions in the restaurant will adapt accordingly. This helps ensure that users are able to find and watch content that is meaningful to them in public spaces.

In some aspects, control circuitry may receive, from a user, a request to view media content. For example, the control circuitry may receive a request from the user, upon entering a restaurant. In some embodiments, control circuitry may receive a request from the user via the mobile device of the user. For example, the request may be through an application on the mobile phone of the user, indicating that the user wishes to use one of the televisions in the restaurant.

Control circuitry may then, in response to receiving the request, determine both a location of the user and media content preferences of the user. For example, once the request has been received via the application on the mobile phone of the user, the control circuitry may locate the mobile phone by accessing a GPS that is integrated with the mobile phone of the user, and by determining the location of the mobile phone via GPS, determine that the user has just entered the restaurant. The control circuitry may then, for example, access a user profile of the user which includes viewing history of media content. A viewing history of sports games in which most of the media content is a set of specific sports (e.g., basketball, hockey) or teams (e.g., Knicks, Rangers) shows that the user has a general preference for sports, and some preferences within sports.

Control circuitry may identify a plurality of display devices that are within a threshold proximity to the user. In some embodiments, threshold proximity may be determined based on any of a) a radial distance from the user, b) a region defined by the user, c) a range determined by limitations of a mobile device of the user, and the like. For example, using the GPS location of the mobile phone, the control circuitry may determine that the televisions at the bar of the restaurant are closer to the user then the televisions in the back room of the restaurant. The threshold proximity, in this example, may be determined by a number of feet from the user to ensure that he can see the screen comfortably. In another example, the control circuitry may receive, via the application on the mobile phone, a request to set the threshold proximity to include any devices along a specific wall of the restaurant due to the angle at which the user is seated. In yet another example, the control circuitry may determine the threshold proximity to be any device which can connect to the same wireless network as the mobile device.

Control circuitry may identify a respective media asset that is presently displayed at each display device of the plurality of display devices. For example, control circuitry may determine that of the three televisions at the bar, one is showing an action movie, one is showing a soap opera, and one is showing a sports game, by requesting that each device identify the media asset currently displayed. In some embodiments, control circuitry may transmit a respective request to each display device of the plurality of display devices and determine, based on the response from each respective request, the identity of each respective media asset. For example, control circuitry may request that each of the televisions within the threshold proximity identify the media assets displayed and receive a notification from one of the televisions that an action movie is currently displayed.

Control circuitry may determine, based on the media content preferences of the user, a recommended display device, of the plurality of display devices that are presently displaying media content, that is likely to be preferred by the user. In some embodiments, control circuitry may compare respective metadata that is displayed at each display device to attributes of the media content preferences of the user and determine the recommended display device to be the display device that is currently displaying the respective media asset with, relative to each other respective media asset, the most metadata in common with the attributes of the media content preferences of the user. For example, control circuitry may have identified that one of the televisions is displaying an action movie with a famous actor and a second is displaying a soap opera. If the user has a user profile listing a variety of movies and television shows including action movies and soap operas as well as a set of favorite actors which includes the famous actor in the action movie, control circuitry may determine that the recommended display is the display with the action movie, due to the higher number of matches with the user preferences.

In some embodiments, when determining a recommended display, control circuitry may determine a user of each device of the plurality of display devices. For example, if the control circuitry had previously recommended another user watch the basketball game on the second television, control circuitry may determine that the other user is currently watching the game on the second television. Control circuitry may then determine a relationship between the user and the user of each device. For example, control circuitry may access the user profile of the user and determine that the user and the other user know each other on a social media site and are therefore friends. Control circuitry may determine the recommended display device based on the relationship between the user and the user of the device in addition to the media content preferences of the user. For example, control circuitry may recommend the second television to the user as it is displaying the sports game which matches the preferences of the user and has a friend already watching it, over another television also showing a sports game which matches the preferences of the user (e.g., basketball).

Control circuitry may provide the user with an identification of the recommended display device. For example, control circuitry may indicate the location of the display device, such as a notification that one of the televisions at the bar is already showing the basketball game and instructions on where to look in the bar for the television.

In some embodiments, when providing the user with the identification of the recommended display device, control circuitry may provide instructions for the user to locate the recommended display device. For example, control circuitry may indicate that the user can find his favorite movie playing in the room on the first floor to the left of the entryway by providing a map of the restaurant or by text description.

In some embodiments, when providing the user with the identification of the recommended display device, control circuitry may provide an identification of the media content currently displayed. For example, control circuitry may provide the title of the content (e.g., "March Madness") along with a description of the metadata that was used to select the media content over other options (e.g., "genre: sports").

In some embodiments, when providing the user with the identification of the recommended display device, control circuitry may provide an identification of a present user of the recommended display device and an indication of a relationship between the user and the present user when providing the user with the identification of the recommended display device. For example, control circuitry may indicate that a friend has already been recommended the same device for watching the basketball game and is presently watching.

In some embodiments, control circuitry may provide the present user of the recommended display device with a notification that the device is recommended to the user. For example, control circuitry may indicate on the television screen that the user has been notified of the basketball game currently playing on the television.

In some aspects, control circuitry may identify a plurality of users who are presently in a bounded physical space. For example, control circuitry may track the location of a set of users with a user profile by accessing the GPS in each of the mobile devices and include the users in the plurality of users once the users have entered the bounded physical space such as a public square (e.g., Times Square).

Control circuitry may determine preferences of each user of the plurality of users by accessing a respective user profile of each user of the plurality of users. For example, control circuitry may access a user profile listing favorite media content on a social media site for each of the users identified in Times Square to determine the favorite television media asset of each user.

Control circuitry may aggregate the preferences of each user of the plurality of users. In some embodiments, control circuitry may match the media content preferences of each user to any of the plurality of candidate media content and determine how many of the users prefer each of the plurality of candidate media content. For example, control circuitry may have set categories of media content such as fashion and sports related content, and may sort the plurality of users into a group of users that prefer sports content and a group of users that prefer fashion related content, and count the number of users in each group. If the number of users who prefer sports related content is greater than the number of users who prefer fashion related content, the aggregated preference of the plurality of users is the sports related content.

Control circuitry may select media content of a plurality of candidate media content based on the aggregated preferences. For example, control circuitry may select media content from the category of sports related media content due to the fact that the aggregated preferences of the plurality of users showed a preference for sports related content.

Control circuitry may generate for display the selected media content on a display device that is viewable by the plurality of users. For example, control circuitry may display an advertisement for a sports network (e.g., ESPN) on one of the public billboards.

In some embodiments, control circuitry may designate the bounded physical space to be a region from which, at each point in the region, there is a line of sight to the display device. For example, control circuitry may identify users from a video surveillance based from the display device, so that any user within sight of the display device is also within sight of the video surveillance.

In some embodiments, control circuitry may dynamically change the bounded physical space based on a population density in a predetermined region of space, and in which the population density is determined based on the nearness of each user of the plurality of users with respect to the others. For example, control circuitry may designate physical bounded space to be areas with population density above a density threshold, so as users disperse, the definition of the bounded physical space will change.

In some embodiments, when determining preferences of each user, control circuitry may access a respective user profile of each user, in which each respective user profile includes at least one of the following: a viewing history of media content, ratings for media content, favorite examples of media content, preferred genres or types of media content, and a history of metadata associated with previously viewed media content. For example, control circuitry may access the viewing history of the user for an on-demand service. In another example, control circuitry may access the ratings that the user gave for media content on social media sites. In another example, control circuitry may access the listed favorite items on a user profile or social media site which may include favorite genres, shows, actors, sports teams, etc.

In some embodiments, control circuitry may monitor a subset of the plurality of users either entering or leaving the bounded physical space and adapt the selected media content based on the monitoring. For example, if control circuitry determines that the users that are leaving all prefer romance novels and the users that are arriving all prefer sports, control circuitry may adapt and display an advertisement for a sports network (e.g., ESPN) to reflect the fact that more users preferring sports related content have entered the area.

In some embodiments, control circuitry may monitor activity of the plurality of users and determine whether the selected media content is temporally popular based upon the monitored activity. For example, control circuitry may determine that, because some users are cheering and waving their arms, the currently displayed content is popular.

In some embodiments, control circuitry may broadcast a request to each user equipment device present in the bounded physical space and receive, in response to the request, an indication of the identity of each user of the plurality of users. For example, control circuitry may ask each user to identify himself via an application on his mobile phone and add each user who responds to the list of users in the bounded physical space.

In some embodiments, control circuitry may receive requests from one of the plurality of users for additional information related to the selected media content. For example, control circuitry may receive a request via the application on the mobile phone of the user to provide more information about the subject of an advertisement displayed on one of the billboards.

In some embodiments, control circuitry may provide to a user equipment device of a user of the plurality of users an opportunity to purchase a product or service associated with the selected media content. For example, control circuitry may allow the user to purchase an item that is being advertised on one of the billboards via the application on the mobile phone of the user.

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
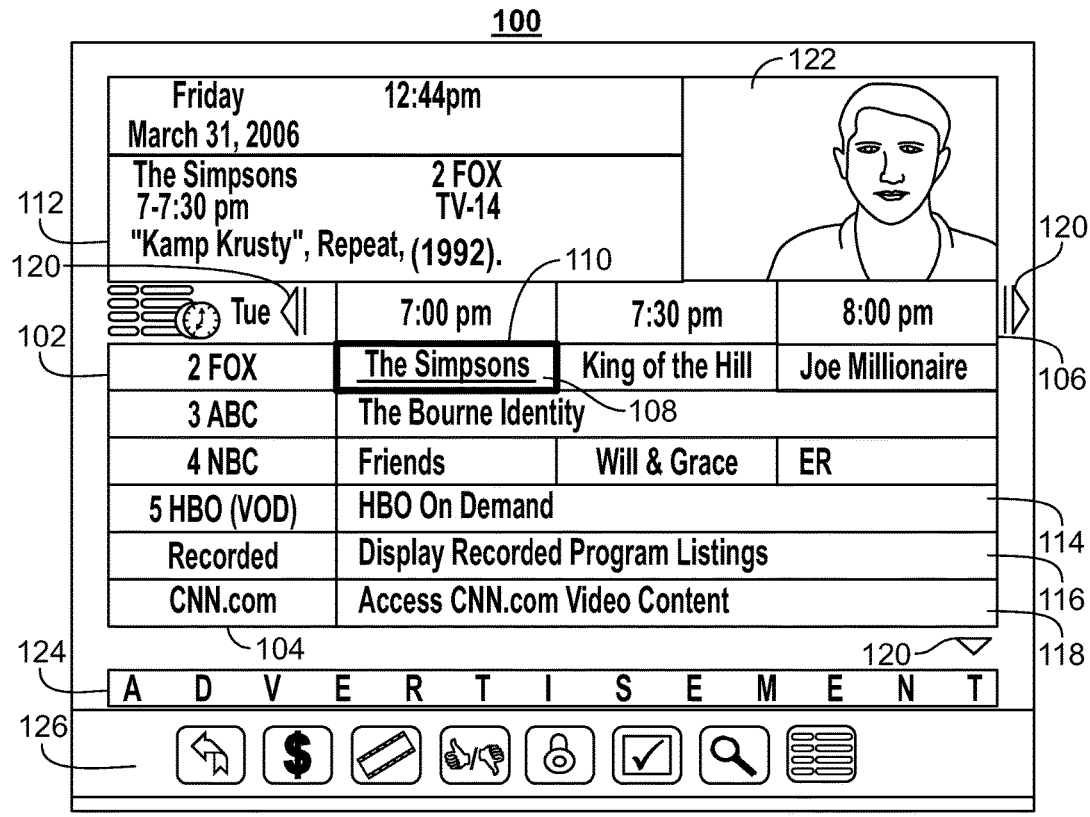
FIG. 1 shows an illustrative example of a media guidance display that may be presented in accordance with some embodiments of the disclosure.

Systems and methods are described herein for coordinating the display of media content on communal display devices. For example, if a user walks into a restaurant and indicates that he wishes to watch one of the televisions, he is directed to a television at the far side of the room which is already playing the sports game with his favorite team. In another example, if a significant number of the users in the restaurant have a preference for watching a news station (e.g., CNN), one of the televisions in the restaurant will adapt accordingly. This helps ensure that users are able to find and watch content that is meaningful to them in public spaces.

In some aspects, control circuitry may receive, from a user, a request to view media content. For example, the control circuitry may receive a request from the user, upon entering a restaurant. In some embodiments, control circuitry may receive a request from the user via the mobile device of the user. For example, the request may be through an application on the mobile phone of the user, indicating that the user wishes to use one of the televisions in the restaurant.

Control circuitry may then, in response to receiving the request, determine both a location of the user and media content preferences of the user. For example, once the request has been received via the application on the mobile phone of the user, the control circuitry may locate the mobile phone by accessing a GPS that is integrated with the mobile phone of the user, and by determining the location of the mobile phone via GPS, determine that the user has just entered the restaurant. The control circuitry may then, for example, access a user profile of the user which includes viewing history of media content. A viewing history of sports games in which most of the media content is a set of specific sports (e.g., basketball, hockey) or teams (e.g., Knicks, Rangers) shows that the user has a general preference for sports, and some preferences within sports.

Control circuitry may identify a plurality of display devices that are within a threshold proximity to the user. In some embodiments, threshold proximity may be determined based on any of a) a radial distance from the user, b) a region defined by the user, c) a range determined by limitations of a mobile device of the user, and the like. For example, using the GPS location of the mobile phone, the control circuitry may determine that the televisions at the bar of the restaurant are closer to the user then the televisions in the back room of the restaurant. The threshold proximity, in this example, may be determined by a number of feet from the user to ensure that he can see the screen comfortably. In another example, the control circuitry may receive, via the application on the mobile phone, a request to set the threshold proximity to include any devices along a specific wall of the restaurant due to the angle at which the user is seated. In yet another example, the control circuitry may determine the threshold proximity to be any device which can connect to the same wireless network as the mobile device.

Control circuitry may identify a respective media asset that is presently displayed at each display device of the plurality of display devices. For example, control circuitry may determine that of the three televisions at the bar, one is showing an action movie, one is showing a soap opera, and one is showing a sports game, by requesting that each device identify the media asset currently displayed. In some embodiments, control circuitry may transmit a respective request to each display device of the plurality of display devices and determine, based on the response from each respective request, the identity of each respective media asset. For example, control circuitry may request that each of the televisions within the threshold proximity identify the media assets displayed and receive a notification from one of the televisions that an action movie is currently displayed.

Control circuitry may determine, based on the media content preferences of the user, a recommended display device, of the plurality of display devices that are presently displaying media content, that is likely to be preferred by the user. In some embodiments, control circuitry may compare respective metadata that is displayed at each display device to attributes of the media content preferences of the user and determine the recommended display device to be the display device that is currently displaying the respective media asset with, relative to each other respective media asset, the most metadata in common with the attributes of the media content preferences of the user. For example, control circuitry may have identified that one of the televisions is displaying an action movie with a famous actor and a second is displaying a soap opera. If the user has a user profile listing a variety of movies and television shows including action movies and soap operas as well as a set of favorite actors which includes the famous actor in the action movie, control circuitry may determine that the recommended display is the display with the action movie, due to the higher number of matches with the user preferences.

Control circuitry may provide the user with an identification of the recommended display device. For example, control circuitry may indicate the location of the display device, such as a notification that one of the televisions at the bar is already showing the basketball game and instructions on where to look in the bar for the television.

In some aspects, control circuitry may identify a plurality of users who are presently in a bounded physical space. For example, control circuitry may track the location of a set of users with a user profile by accessing the GPS in each of the mobile devices and include the users in the plurality of users once the users have entered the bounded physical space such as a public square (e.g., Times Square).

Control circuitry may determine preferences of each user of the plurality of users by accessing a respective user profile of each user of the plurality of users. For example, control circuitry may access a user profile listing favorite media content on a social media site for each of the users identified in Times Square to determine the favorite television media asset of each user.

Control circuitry may aggregate the preferences of each user of the plurality of users. In some embodiments, control circuitry may match the media content preferences of each user to any of the plurality of candidate media content and determine how many of the users prefer each of the plurality of candidate media content. For example, control circuitry may have set categories of media content such as fashion and sports related content, and may sort the plurality of users into a group of users that prefer sports content and a group of users that prefer fashion related content, and count the number of users in each group. If the number of users who prefer sports related content is greater than the number of users who prefer fashion related content, the aggregated preference of the plurality of users is the sports related content.

Control circuitry may select media content of a plurality of candidate media content based on the aggregated preferences. For example, control circuitry may select media content from the category of sports related media content due to the fact that the aggregated preferences of the plurality of users showed a preference for sports related content.

Control circuitry may generate for display the selected media content on a display device that is viewable by the plurality of users. For example, control circuitry may display an advertisement for a sports network (e.g., ESPN) on one of the public billboards.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
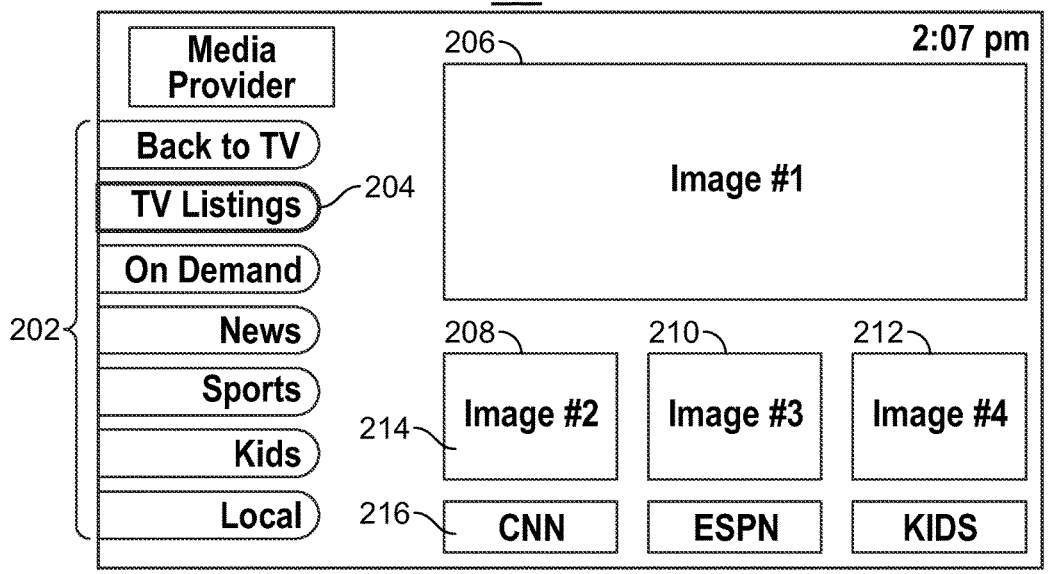
FIG. 2 shows another illustrative example of a media guidance display that may be presented in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
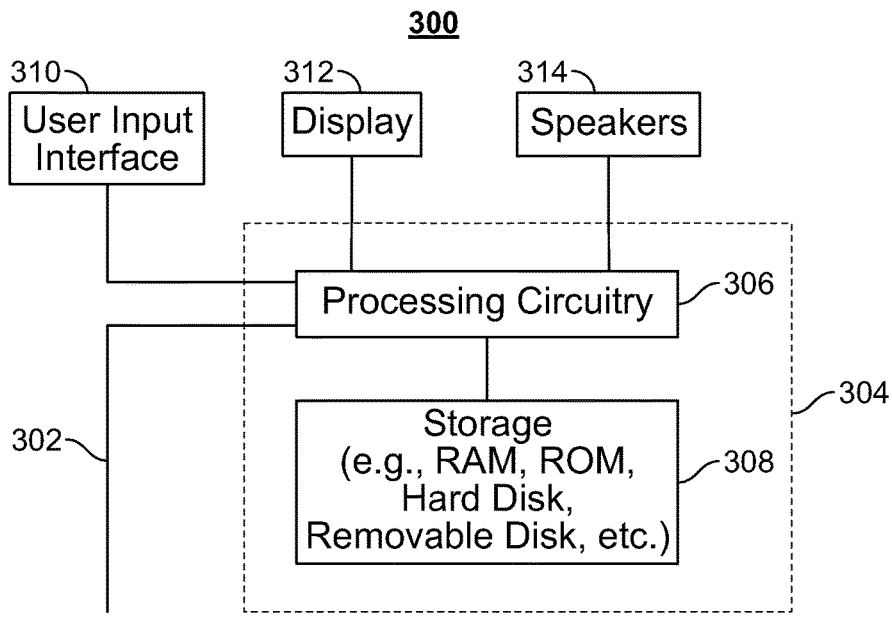
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays.

For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
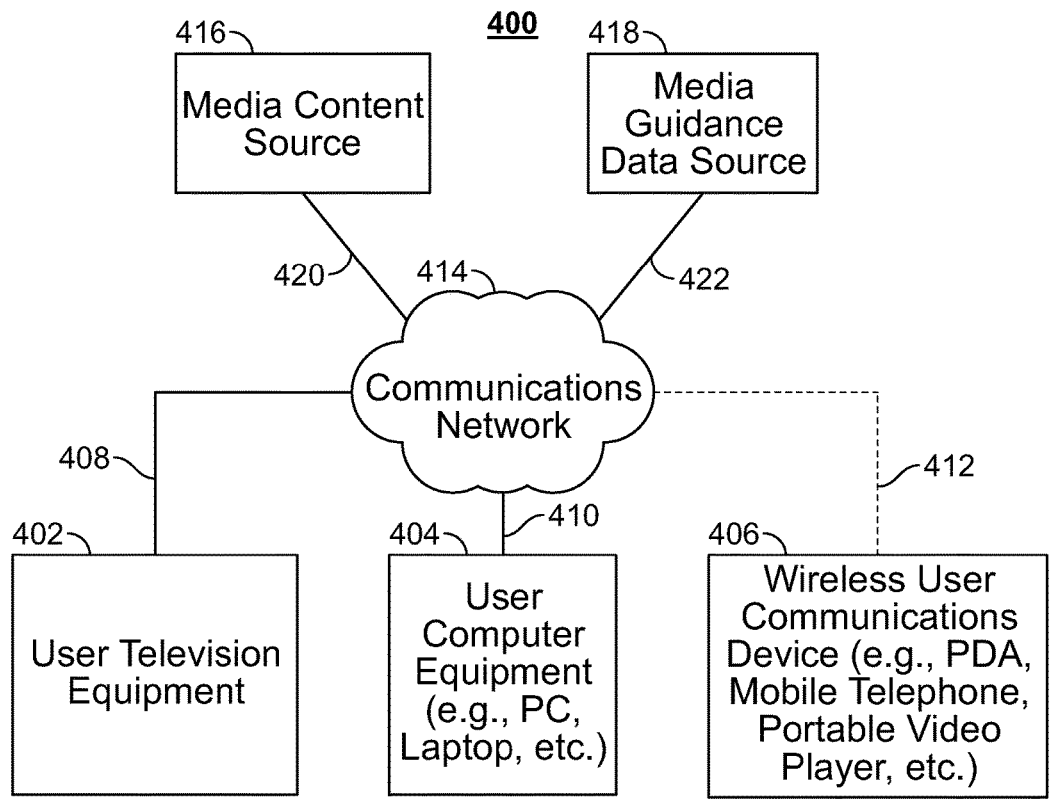
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As used herein, the term "bounded physical space" may be defined based on population density, line of sight to the display device, or distance from the display device. For example, control circuitry 304 may determine a bounded physical space to be any area monitored to have a population density above a certain density threshold. The density threshold may be set by default, determined by control circuitry 304, or input by user via user input interface 310. In another example, control circuitry 304 may determine a bounded physical space to be an area within a specific distance or range of a display device. The distance from a display device may be set by default, determined by control circuitry 304, or input by user via user input interface 310. In yet another example, bounded physical space may be defined as the region in which, at all points within the region, there is a line of sight to a display device. Control circuitry 304 may determine a region in which all points of the region have a line of sight to a display device by monitoring a region so that by definition any user within range of observation is within the line of sight of the display device.

As used herein, a "social network" refers to a platform that facilitates networking and/or social relations among people who, for example, share interests, activities, backgrounds, and/or real-life connections. In some cases, social networks may facilitate communication among multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user. As used herein, "social network content" refers to the content that is created, consumed, or posted by a user of a social network. The social network content may include status updates, microblog posts, images, graphic messages, etc. Social network content may be shared among users of the social network.

As used herein, "communal media area" or "media area" refers to an area which includes multiple display devices, such as in a restaurant or apartment building, with users leaving, arriving, and watching a display device at any time. In some embodiments, control circuitry 304 may recommend a display device of the display devices in the media area. In some embodiments, control circuitry 304 may recommend one of the display devices in multiple media areas. In some embodiments, control circuitry 304 may generate a display of selected media content based upon aggregated user preferences of the users within the media area. In some embodiments, control circuitry 304 may provide notification to any of the users in the media area regarding any of the others users in the media area, the relationships between the users, or the other media displayed on other display devices.

In some embodiments, control circuitry 304 may receive a user request to watch one of the communal televisions in a restaurant. Control circuitry 304 may, in response to the request, determine where in the restaurant the user is, based on the surveillance system of the restaurant, and access the social media profile of the user to determine media content preferences. Control circuitry 304 may then identify which of the televisions are within view of the user and may access a listing of what content is being displayed on each of the identified televisions. By comparing the media content preferences of the user with the currently displayed content, control circuitry 304 may determine which television the user would most prefer and provide the recommendation to the user. This may help the user determine which of the communal display devices is displaying the content that he will prefer.

Figure 5:
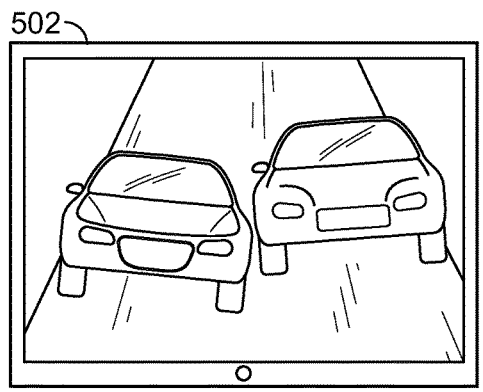
FIG. 5 shows an illustrative embodiment of a plurality of display devices to recommend to a user, in accordance with some embodiments of the disclosure.
Figure 5:
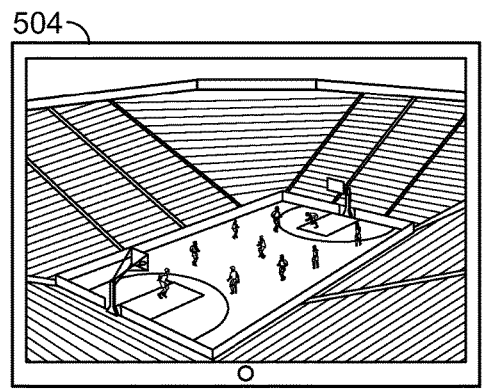
Figure 5:
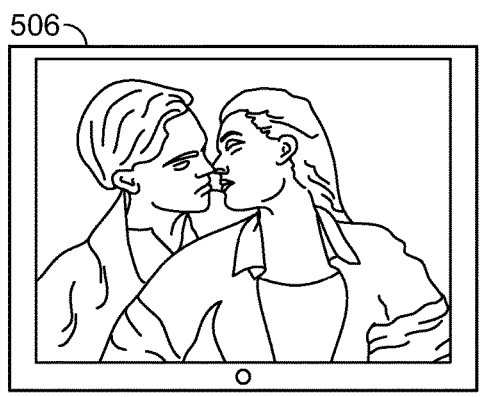
Figure 5:
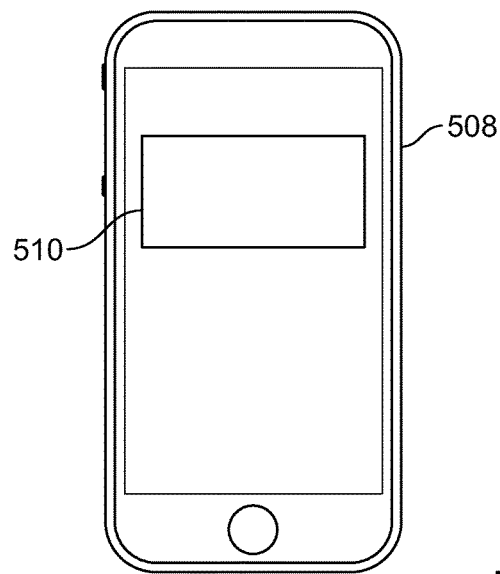

FIG. 5 shows an illustrative embodiment of a plurality of display devices to recommend to a user, in accordance with some embodiments of the disclosure. FIG. 5 shows display devices 502, 504, and 506 and user equipment device 508 with an interactive display 510 (e.g., user input interface 310). Each of the display devices 502, 504, and 506 as well as user equipment device 508 may have functionality of user equipment 402, 404, and/or 406. The interactive display 510 may have functionality of user input interface 310 and display 312. In some embodiments, control circuitry 304 receives from the user (e.g., by way of communications network 414 over paths 408, 410, or 412 or by way of user input interface 310), a request to view media content. In some embodiments, control circuitry 304 may receive the request from a mobile device of the user (e.g., user equipment device 508) in which the request is an indication of a selection made by the user via interactive display 510. A request may be in the form of voice input, gesture control, text message, phone call and the like. For example, control circuitry 304 may detect a user entering a restaurant and performing a motion with the mobile phone of the user and in doing so, express interest in watching one of the televisions around the room (e.g., plurality of display devices 502, 504, and 506).

In some embodiments, control circuitry 304 may determine both a location of the user and media content preferences of the user in response to receiving the request. In some embodiments, control circuitry 304 may determine the location of user equipment device 508 using any methods for determining location or surveillance such as GPS location, facial recognition of the user through analysis of video or camera data, RFID tags and the like. To determine the location of the user via GPS, control circuitry 304 may access the GPS of user equipment device 508 and assume that user equipment device 508 is at the same location as the user. To determine the location of the user via facial recognition, control circuitry 304 may identify the user via facial recognition techniques such as the Hidden Markov model, Principal Component Analysis using Eigenfaces, Elastic Bunch Graph Matching using the Fisherface algorithm, Linear Discriminate Analysis, and the like performed on frames of video or sequences of frames of video. When performing the facial recognition techniques, control circuitry 304 may determine the location of the user by knowing the location of the camera on which the video was taken. To determine the location of the user via RFID tag, control circuitry 304 may detect one of a series of RFID tags through the use of user equipment device 508. As each of the RFID tags may be placed in a specific known location, control circuitry 304 may determine the location of the user by assuming that the user is with user equipment device 508 and looking up the location of the detected tag. In some embodiments, control circuitry 304 may determine the media content preferences of the user by accessing a pre-existing user profile and determining the likelihood that a user may consume media assets with specific attributes given the content of the user profile. For example, the user profile may be a history of previously consumed media content of the user with a listing of metadata associated with each of the previously viewed media assets. In another example, the user profile may be the social media account of the user and so already include information in the form of posts the user has made, posts the user has consumed, pages the user follows or contributes to, and the like.

In some embodiments, control circuitry 304 may request additional information from the user via user input interface 310 to establish the media content preferences. For example, additional information may be requested via survey sent over the communications network 414 to each user equipment device 508 with questions regarding media content preferences. In some embodiments, control circuitry 304 may determine preferences by analyzing the contents of the user profile and identifying trends among preferred content. For example, if the user profile includes a wide variety of sports related content but does not mention fashion related content, control circuitry 304 may determine that the user will have a stronger preference for a sports game then a fashion show.

In some embodiments, control circuitry 304 may identify a plurality of display devices (e.g., display devices 502, 504, and 506) that are within a threshold proximity to the user (e.g., user equipment device 508). In some embodiments, control circuitry 304 may consider any of the display devices in a communal media area, such as in a restaurant or lounge of an apartment building, as possible display devices within the threshold proximity to the user. In some embodiments, control circuitry 304 may determine threshold proximity based on a radial distance from the user in which the radial distance is a value set to a default or entered by the user through user interaction via user input interface 310. For example, control circuitry 304 may determine that display device 502 is within the default distance of 6 feet from user equipment device 508, while display device 506 is 10 feet away from user equipment device 508 and therefore not within threshold proximity. In some embodiments, control circuitry 304 may determine threshold proximity based on a region defined by the user via user input interface 310 or interactive display 510. For example, a user facing one wall of a restaurant due to seating arrangements may specify that only televisions along a specific wall be considered. In some embodiments, control circuitry 304 may determine threshold proximity based on a range determined by limitations of a mobile device (e.g., user equipment device 508) of a user. For example, the plurality of display devices 502, 504, and 506 may be limited to the display devices which are connected to the same communications network 414 (e.g., Bluetooth, Wi-Fi) as user equipment device 508.

In some embodiments, control circuitry 304 may identify a respective media asset that is presently displayed at each display device 502, 504 and 506. In some embodiments, control circuitry 304 may transmit a respective request over communications network 414 to each display device of the plurality of display devices 502, 504, and 506, and determine, based on each respective request, the identity of each respective media asset. For example, control circuitry 304 may request that each of the televisions in restaurant (e.g., plurality of display devices 502, 504, and 506) provide the name of the media asset currently displayed on the screen. In some embodiments, control circuitry 304 may determine the identity of each respective media asset by accessing media content 416 or media guidance data source 418. For example, by accessing the media guidance data source 418, control circuitry 304 may determine that display device 502 is displaying an action movie, display device 504 is displaying a basketball, and display device 506 is displaying a soap opera. In some embodiments, the identity of the media content may include title, genre, cast, and the like.

In some embodiments, control circuitry 304 may determine, based on the media content preference of the user, a recommended display device 504 of the plurality of display devices 502, 504, and 506 that is presently displaying media content that is likely to be preferred by the user. In some embodiments, control circuitry 304 may compare respective metadata of each respective media asset that is displayed at each of the plurality of display devices 502, 504, and 506 to attributes of the media content preferences of the user. Control circuitry 304 may, based on the comparison of the metadata of the media assets and the media content preferences of the user, determine that recommended display device 504 is the display device of the plurality of display devices 502, 504, and 506 that is currently displaying the respective media asset with, relative to each other respective media asset, the most metadata in common with the attributes of the media content preferences of the user. In some embodiments, control circuitry 304 may determine the metadata of the media asset by media content source 416 or media guidance data source 418. In some embodiments, control circuitry 304 may compare metadata describing the title, genre, or any other attribute that can be used to describe a media asset. In some embodiments, an attribute may be any characteristic of media content or type of metadata that can be used to describe media content or a subset of media content such as genre, cast, type of media content, and the like. For example, control circuitry 304 may compare the listing of favorite sports teams listed in the user profile with the metadata retrieved to identify the media content including genre such as "Action Movie," title such as "March Madness," and so on.

In another example, control circuitry 304 may determine a user of each device of the plurality of display devices 502, 504, and 506, determine the relationship between the user and the user of display devices 502, 504, and 506, and determine the recommended display device 504 based on the relationship, in addition to the media content preferences of the user. For example, control circuitry 304 may recommend display device 502 over display device 504 if a friend of the user from a social media site is already in the restaurant watching display device 502.

In some embodiments, control circuitry 304 may provide, via interactive display 510 and/or speakers 314, the user with an identification of the recommended display device 504. In some embodiments, control circuitry 304 may provide instructions for the user to locate the recommended display device 504. In some embodiments, control circuitry 304 may provide instructions in the form of a graphic or text via interactive display 510 describing an area or the position of the recommended display device 504 relative to the position of the user equipment device 508. For example, control circuitry 304 may send over communications network 414 to the user equipment device 508 a map of the restaurant which includes the location of the user and the location of the recommended display device 504.

In some embodiments, control circuitry 304 may provide via interactive display 510 an identification of the media content currently displayed on recommended display device 504. For example, control circuitry 304 may provide a notification on interactive display 510 that indicates that a television (e.g., display device 504) is showing a sports game (e.g., basketball) as well as an indication that the recommendation is based on the match between one of the teams playing and the favorite sports team listed in the user profile (e.g., Knicks). In some embodiments, control circuitry 304 may provide via interactive display 510 an identification of a present user of the recommended display device 504 and an indication of a relationship between the user and the present user. For example, control circuitry 304 may provide a notification on interactive display 510 that includes a listing of users already watching display device 504 and whether there is an indication of a relationship between the user and any of the other users as determined from a social media site.

In some embodiments, control circuitry 304 may provide a present user of the recommended display device 504 with a notification via display device 504 that the display device 504 is recommended to the user. For example, control circuitry 304 may indicate on the screen of display device 504 that the user is approaching, in order to provide the present user with the opportunity to leave or otherwise prepare himself. In some embodiments, control circuitry 304 may provide an indication of a relationship between the user and the present user of display device 504. In some embodiments, control circuitry 304 may indicate to present users of display devices 502 and 506 that a friend, as determined by a user profile, has been recommended display device 504, in order to provide the present users with the opportunity to consider moving to display device 504 now that a friend has entered the communal media area.

In some embodiments, control circuitry 304 may indicate the approach of the user to any present user who has the user on a list of users to monitor. For example, if a resident of an apartment building enters a lounge and is recommended a TV (e.g., display device 504), control circuitry 304 may determine if the resident is on the list of users to monitor for the present user of any of the display devices 502, 506, and 506, and alert the present user accordingly. In some embodiments, control circuitry 304 may request that a user, upon receiving a recommendation, provide the control circuitry 304 with a list of users to monitor. For example, once control circuitry 304 recommends display device 504 to a resident of an apartment building in a media area such as a lounge, control circuitry 304 may request that the resident select users from a list of residents of the building. In some embodiments, control circuitry 304 may generate a list of users to monitor based on a user profile. For example, control circuitry 304 may determine, based on the user profile, the roommates of each resident and provide an indication of an approaching user if the approaching user is a roommate of the present user.

In some embodiments, the user can see what is displayed on non-recommended display devices 502 and 506. In some embodiments, control circuitry 304 may provide the user with an indication of what display devices are in use and what display devices are not in use. In some embodiments, control circuitry 304 may provide the user with an indication of other present users at each display device. In some embodiments, control circuitry 304 may provide the user with an indication of a playlist which shows the media assets displaying next on a recommended display device 504.

In some embodiments, control circuitry 304 may identify a group of users who are gathered together in a single location and determine the preferences of each user in the group by accessing a user profile of each of the users and aggregating the preferences for each of the users. Control circuitry 304 may then select media content from a set list of options based on the collected preferences of the group and generate for display the selected media content on a display device that is viewable by the plurality of users.

Figure 6:
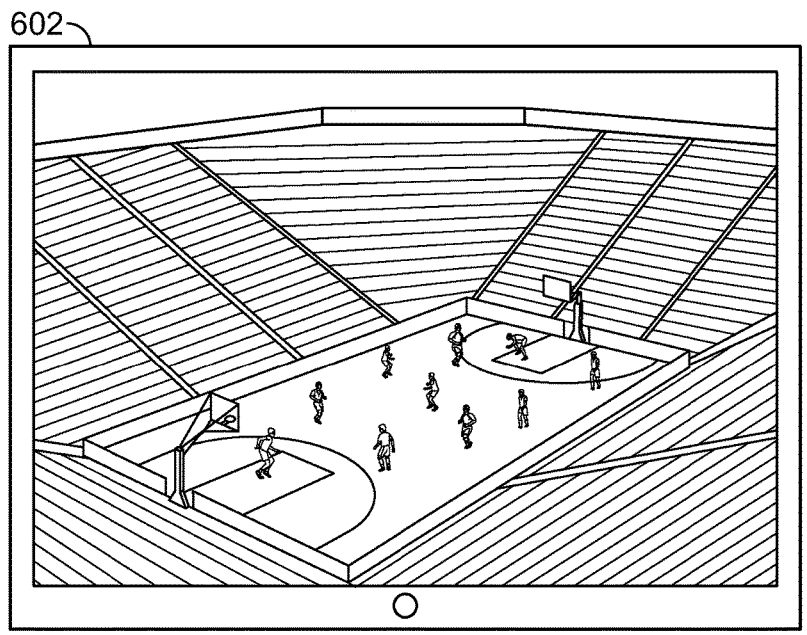
FIG. 6 shows an illustrative embodiment of user equipment devices in a bounded physical space and a display device for generating select media content, in accordance with some embodiments of the disclosure.
Figure 6:
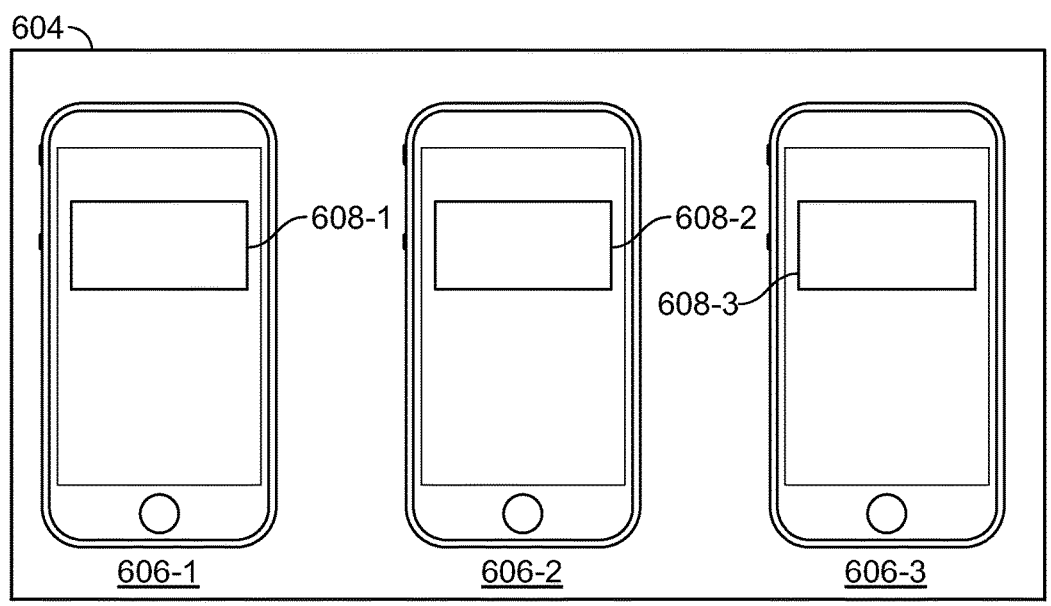

FIG. 6 shows an illustrative embodiment of a user equipment devices in a bounded physical space and a display device for generating select media content, in accordance with some embodiments of the disclosure. FIG. 6 shows display device 602 and user equipment device 606-1, 606-2, 606-3, with interactive displays 608-1, 608-2, and 608-3 respectively, in the bounded physical space 604. Display device 602 and user equipment device 606 may each have functionality of user equipment 402, 404, and/or 406. Interactive display 608 may have functionality of user input interface 310 and display 312. In some embodiments, control circuitry 304 may identify a plurality of users who are presently in a bounded physical space 604. In some embodiments, control circuitry 304 may transmit a request over communications network 414 to each user equipment device 606 present in the bounded physical space 604, and receive, in response to the request, an indication of the identity of each user on interactive display 608 over communications network 414. In some embodiments, control circuitry 304 may identify each user through user equipment device 606 by asking the user to identify himself via interactive display 608 or user input interface 310 while in bounded physical space 604. For example, upon entering a public square (e.g., Times Square), control circuitry 304 may send a survey requiring he provide information regarding his identity, access to a user profile, media content preferences or any of the like. In some embodiments, control circuitry 304 may identify each user by accessing a listing of users and user equipment devices 606 which have previously selected to join and have been identified. For example, the user may have at a time in the past provided identity information which can be accessed once the user enters bounded physical space 604 (e.g., Times Square).

In some embodiments, control circuitry 304, when identifying a plurality of users who are presently in a bounded physical space 604, may automatically determine the identity of the user by matching user equipment device 606 to a list of possible user equipment device 606 with associated users. For example, if there are a plurality of users with a user profile listing identity information including the identification of a mobile device (e.g., user equipment device 606), control circuitry 304 may identify each of the users in the bounded physical space 604 by the identifying of the mobile device and accessing the listing of user profiles.

In some embodiments, control circuitry may determine the location of the user through the user equipment device 606 or using any methods for determining location or surveillance such as GPS location, facial recognition of the user through analysis of video or camera data, RFID tags and the like. To determine the location of the user via GPS, control circuitry 304 may access the GPS of user equipment device 508 and assume that user equipment device 508 is at the same location as the user. To determine the location of the user via facial recognition, control circuitry 304 may identify the user via facial recognition techniques such as the Hidden Markov model, Principal Component Analysis using Eigenfaces, Elastic Bunch Graph Matching using the Fisherface algorithm, Linear Discriminate Analysis, and the like performed on frames of video or sequences of frames of video. When performing the facial recognition techniques, control circuitry 304 may determine the location of the user by knowing the location of the camera on which the video was taken. To determine the location of the user via RFID tag, control circuitry 304 may detect one of a series of RFID tags through the use of user equipment device 508. As each of the RFID tags may be placed in a specific known location, control circuitry 304 may determine the location of the user by assuming that the user is with user equipment device 508 and looking up the location of the detected tag. In some embodiments, control circuitry 304 may require an identity in the form of a user profile set up by the user. In some embodiments, control circuitry may require an identity which includes access to a user profile of the user. For example, control circuitry 304 may require access to a social media profile to identify the user.

In some embodiments, control circuitry 304 may designate the bounded physical space 604 to be a region from which, at each point in the region, there is a line of sight to the display device 602. For example, control circuitry 304 may designate the bounded physical space 604 to include areas which are within sight of display device 602 as determined by a video surveillance system or within a certain distance. In some embodiments, control circuitry 304 may dynamically change the bounded physical space 604 based on a population density in a predetermined region of space, and in which the population density is determined based on the nearness of each user of the plurality of users with respect to the others. In some embodiments, control circuitry 304 may determine population density through the tracking of the users identified and calculating the number of users in each subdivided area of bounded physical space 604. To calculate the number of users in each subdivided area, control circuitry 304 may track the users within the bounded physical space 604, sort the users into groups based on which of the predetermined subdivided areas each user is in currently, and count how many users are in each group. In some embodiments, control circuitry may utilize analysis of surveillance of bounded physical space 604 to calculate the population density of any subdivided area in bounded physical space 604, whether or not the users have been identified.

In some embodiments, control circuitry 304 may determine preferences of each user of the plurality of users by accessing a respective user profile of each user of the plurality of users. In some embodiments, control circuitry 304 may access a respective user profile of each user, wherein each respective user profile includes at least one of a) a viewing history of media content, b) ratings for media content, c) favorite examples of media content, d) preferred genres or types of media content, and e) a history of metadata associated with previously viewed media content. In some embodiments, once control circuitry 304 has accessed the user profile (e.g., stored in media content source 416 or media guidance data source 418, via communications network 414), control circuitry 304 may determine preferences by analyzing the contents of the user profile and identifying trends among preferred content. For example, if the user profile includes a wide variety of sports related content but does not mention fashion related content, control circuitry 304 may determine that the user will have a stronger preference for an advertisement for SPORTS NETWORK (e.g., ESPN) then a designer line of handbags.

In some embodiments, control circuitry 304 may aggregate the preferences of each user of the plurality of users. In some embodiments, control circuitry 304 may match the media content preferences to any of the plurality of candidate media content for display on display device 602 and determine how many of the users prefer each of the plurality of candidate media content. In some embodiments, control circuitry 304 may match the media content preferences to any of the plurality of candidate media content based on which of the candidate media assets the user has the strongest preference for, as indicated by the media content preference. For example, the candidate media may be predetermined to be a specific list of advertisements for public billboards, and the users may be sorted into groups based on which of the options each user is likely to prefer among the list. In some embodiments in which the preferences include specific preferred content, control circuitry 304 may determine that a media asset which is preferred by a set number of users of the group passes a popularity threshold and so is considered as candidate media content. For example, if a media asset, such as a movie franchise, is preferred by a certain number of people in the bounded physical space 604, an advertisement for that item or a similar or related item, such as a trailer for the most recently released movie in the franchise, may be added to the list of candidate media content.

In some embodiments, control circuitry 304 may select media content of a plurality of candidate media content based on the aggregated preferences. In some embodiments, control circuitry 304 may determine the select media content by selecting the most popular option of the candidate media content. For example, given a list of the number of users who have been sorted into groups of users who would prefer a candidate media asset (e.g., sports related content) over the other candidate media assets (e.g., fashion related content), the select media content is the candidate media asset with the largest group of users who would prefer it (e.g., sports related content).

In some embodiments, control circuitry 304 may generate for display the selected media content on a display device 602 that is viewable by the plurality of users with user equipment device 606. For example, if the users are all gathered in a public square (e.g., Times Square), the display device 602 will be one of the billboards that is viewable from the public square and not a television within the restaurant of one of the buildings adjacent to the public square.

In some embodiments, control circuitry 304 may monitor a subset of the plurality of users either entering or leaving the bounded physical space 604 and adapt the selected media content displayed on display device 602 based on the monitoring of the bounded physical space 604. In some embodiments, control circuitry 304 may monitor bounded physical space 604 through the tracking of location of the users as discussed previously. For example, if a number of users preferring sports content leave the area and a number of users preferring romantic comedy movies enter the area, the display device 602 may adapt the content to show a movie trailer rather than sports network (e.g., ESPN) highlights.

In some embodiments, control circuitry 304 may monitor activity of the plurality of users and determine whether the selected media content displayed on display device 602 is temporally popular based upon the monitored activity in the bounded physical space 604. In some embodiments, control circuitry 304 may monitor the activity through surveillance of the bounded physical space 604. For example, if a significant portion of the crowd is monitored to be cheering, then the display device 602 will continue to display similar and related content. In some embodiments, control circuitry 304 may monitor online activity, such as a button which affects a like measurement as part of an application for a mobile device which is designed to interact with the billboard.

In some embodiments, control circuitry 304 may receive requests over communications network 414 from one of the plurality of users for additional information related to the selected media content displayed on display device 602. For example, control circuitry 304 may provide access to additional information, such as location, reservations, ticket pricing, and the like, to a user watching an advertisement for a restaurant or play on display device 602.

In some embodiments, control circuitry 304 may provide to a user, via user equipment device 606, an opportunity to purchase a product or service associated with the selected media content displayed on display device 602. For example, control circuitry 304 may detect options on interactive display 608, and provide the user access to purchase information about items currently or previously displayed, or related to what is currently or previously displayed on display device 602.

Figure 7:
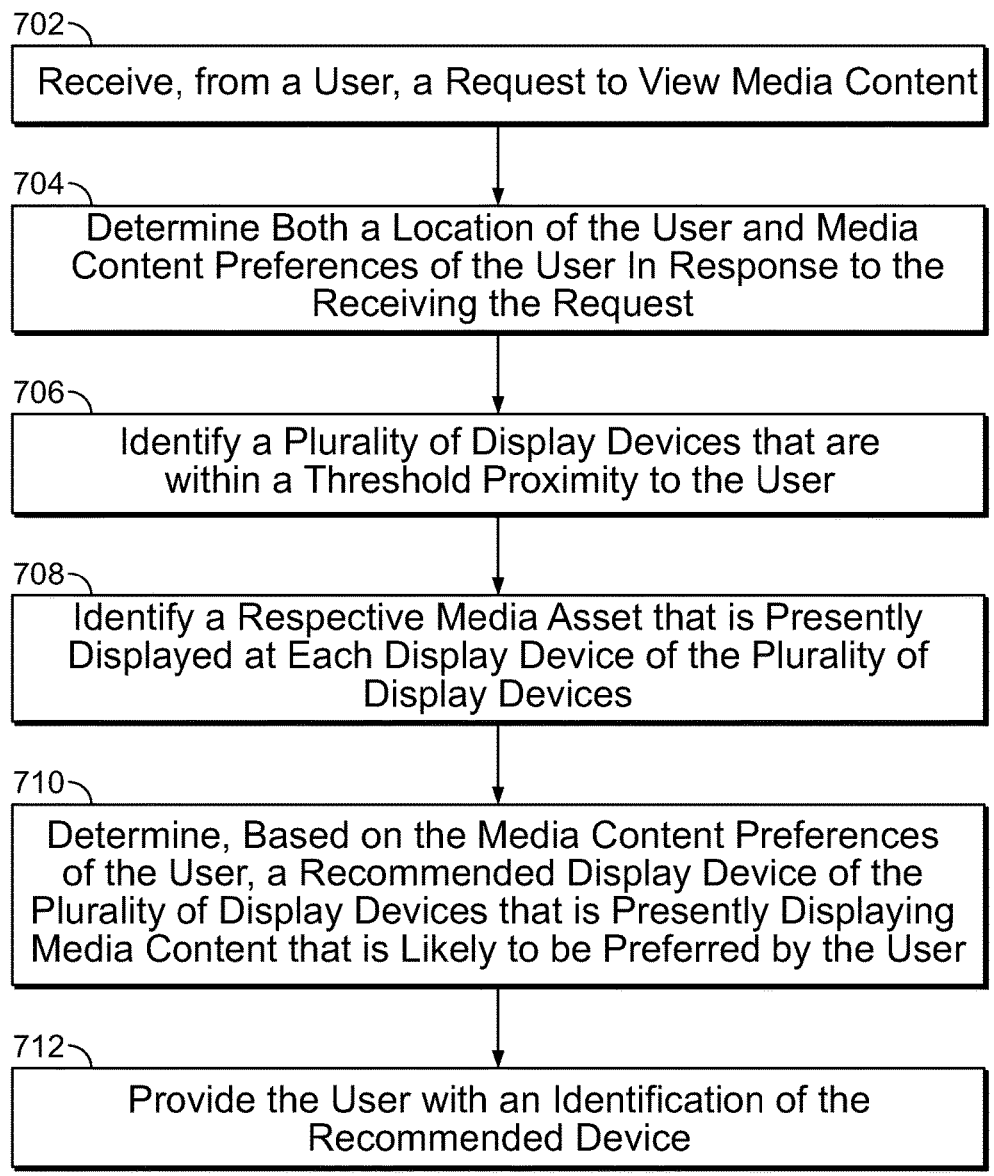
FIG. 7 shows a flowchart of illustrative steps for recommending a display device for media consumption, in accordance with some embodiments of the disclosure.

FIG. 7 shows a flowchart of illustrative steps for recommending a display device for media consumption, in accordance with some embodiments of the disclosure. It should be noted that process 700 or any step thereof could be performed on, or provided by, any of the devices shown in FIGS. 3-4. For example, process 700 may be executed by control circuitry 304 as instructed by a media guidance application implemented on user equipment 402, 404, and/or 406 in order to recommend a display device for media consumption. In addition, one or more steps of process 700 may be incorporated into or combined with one or more steps of any other process or embodiment (e.g., process 800 (FIG. 8)).

At 702, control circuitry 304 may receive, from a user, a request to view media content. For example, if a user walks into a restaurant, control circuitry 304 may receive from the mobile phone of the user (e.g., user equipment device 508) a request (e.g., over communications network 414)) to view media content on one of the televisions (e.g., any of the plurality of display devices 502, 504, and 506). Process 700 proceeds to 704.

At 704, control circuitry 304 may determine both a location of the user and media content preferences of the user in response to receiving the request. For example, control circuitry 304 may determine the GPS location of the mobile phone (e.g., user equipment device 508) and access a user profile associated with the mobile phone, or the user, to determine media content preferences. When accessing the user profile, control circuitry 304 may determine that the user has watched more sports games then soap operas according to the viewing history, and so therefore prefers sports related content. Process 700 proceeds to 706.

At 706, control circuitry 304 may identify a plurality of display devices that are within a threshold proximity to the user. For example, control circuitry 304 may determine that among the televisions in the restaurant, the three televisions behind the bar (e.g., a plurality of display devices 502, 504, and 506) are the display devices within the specific distance set by the user via interactive display 510. Process 70+0 proceeds to 708.

At 708, control circuitry 304 may identify a respective media asset that is presently displayed at each display device of the plurality of display devices. For example, control circuitry 304 may receive from each television (e.g., display device 502, display device 504, and display device 506) the title of the media asset currently displayed. Process 700 proceeds to 710.

At 710, control circuitry 304 may determine, based on the media content preferences of the user, a recommended display device of the plurality of display devices presently displaying media content that is likely to be preferred by the user. For example, control circuitry 304 may determine to recommend the television displaying the sports game (e.g., display device 504) to the user based upon the content displayed and the other users already watching display device 504. Process 700 proceeds to 712.

At 712, control circuitry 304 may provide the user with an identification of the recommended device. For example, control circuitry 304 may notify (e.g., via interactive display 510) the user that the television displaying the sports game (e.g., display device 504) is the center television on the wall behind the bar and notify any users watching display device 504 via the screen of display device 504.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 3-4 could be used to perform one or more of the steps in FIG. 8.

Figure 8:
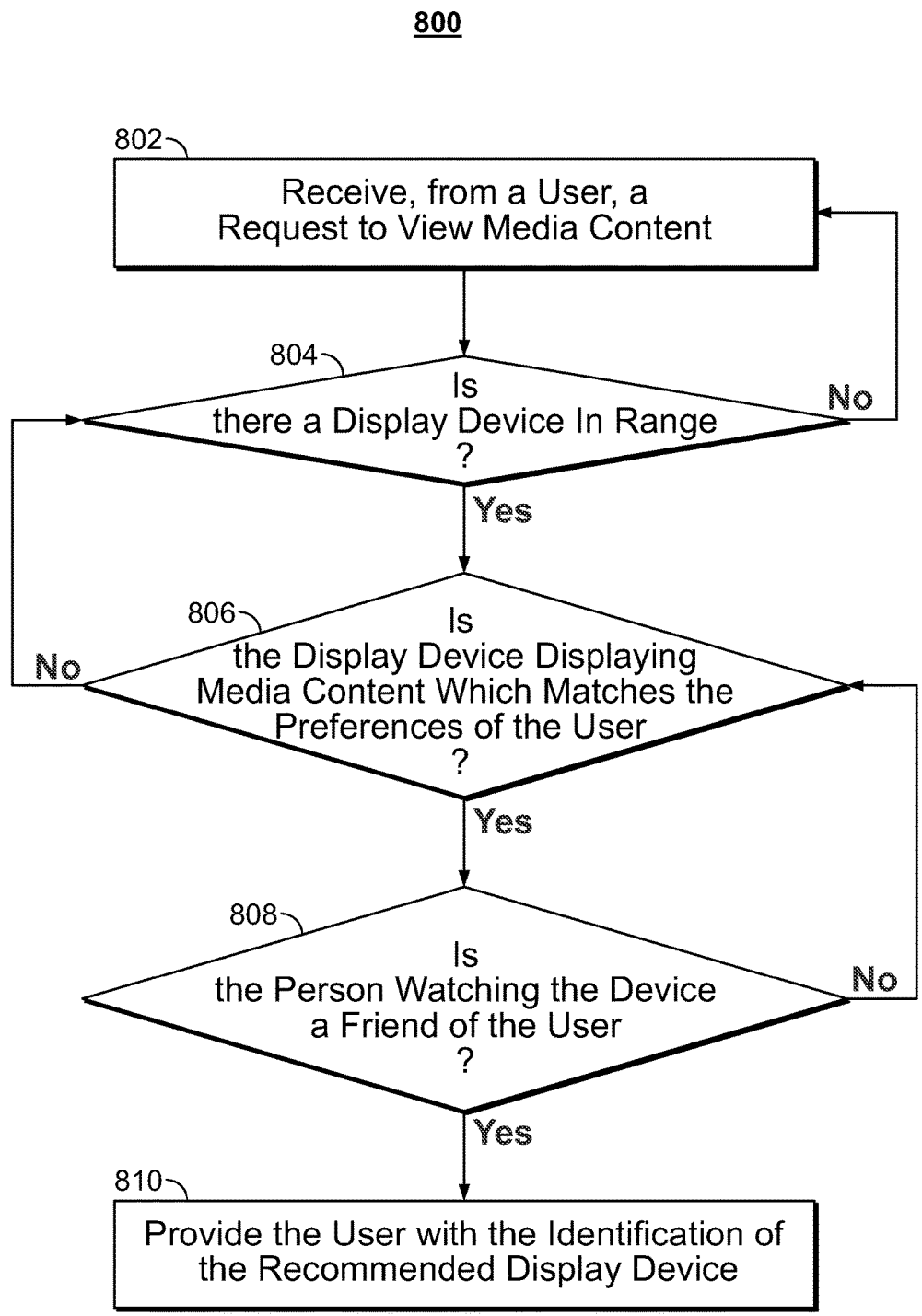
FIG. 8 shows a flowchart of illustrative steps for recommending a display device which meets user criteria for media consumption, in accordance with some embodiments of the disclosure.

FIG. 8 shows a flowchart of illustrative steps for recommending a display device which meets user criteria for media consumption, in accordance with some embodiments of the disclosure. It should be noted that process 800 or any step thereof could be performed on, or provided by, any of the devices shown in FIGS. 3-4. For example, process 800 may be executed by control circuitry 304 as instructed by a media guidance application implemented on user equipment 402, 404, and/or 406 in order to recommend a display device which meets user criteria for media consumption. In addition, one or more steps of process 800 may be incorporated into or combined with one or more steps of any other process or embodiment (e.g., process 700 (FIG. 7)).

At 802, control circuitry may receive, from a user, a request to view media content. For example, if a user walks into a restaurant, control circuitry 304 may receive from the mobile phone of the user (e.g., user equipment device 508) a request (e.g., over communications network 414) to view media content on one of the televisions (e.g., any of the plurality of display devices 502, 504, and 506). Process 800 proceeds to 804.

At 804, control circuitry 304 may determine whether there is a display device within range of the user. For example, control circuitry 304 may check each of the televisions (e.g., the plurality of display devices 502, 504, and 506) and determine for each of the televisions, if there television is a within range of the user. If there is a d television within range of the user, process 800 proceeds to 806. Otherwise, process 800 proceeds to 802.

At 806, control circuitry 304 may determine whether the display device is displaying media content which matches the preferences of the user. For example, control circuitry 304 may determine if the television (e.g., one of the plurality of display devices 502, 504, and 506) that is within range of the user is displaying media content which matches the media content preference of the user, such as sports related content. If there is a display device displaying media content which matches the user preferences, process 800 proceeds to 808. Otherwise process proceeds to 804.

At 808, control circuitry 304 may determine whether the person watching the device is a friend of the user. For example, control circuitry 304 may determine if there is a friend of the user watching the television playing sports related content (e.g., display device 504). If there is a friend of the user watching the television, process 800 proceeds to 810. Otherwise, process proceeds to 806.

At 810, control circuitry 304 may provide the user with an identification of the recommended device. For example, control circuitry 304 may notify (e.g., via interactive display 510) the user that the television displaying the sports game (e.g., display device 504) is the center television on the wall behind the bar and notify any users watching display device 504 via the screen of display device 504.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 9:
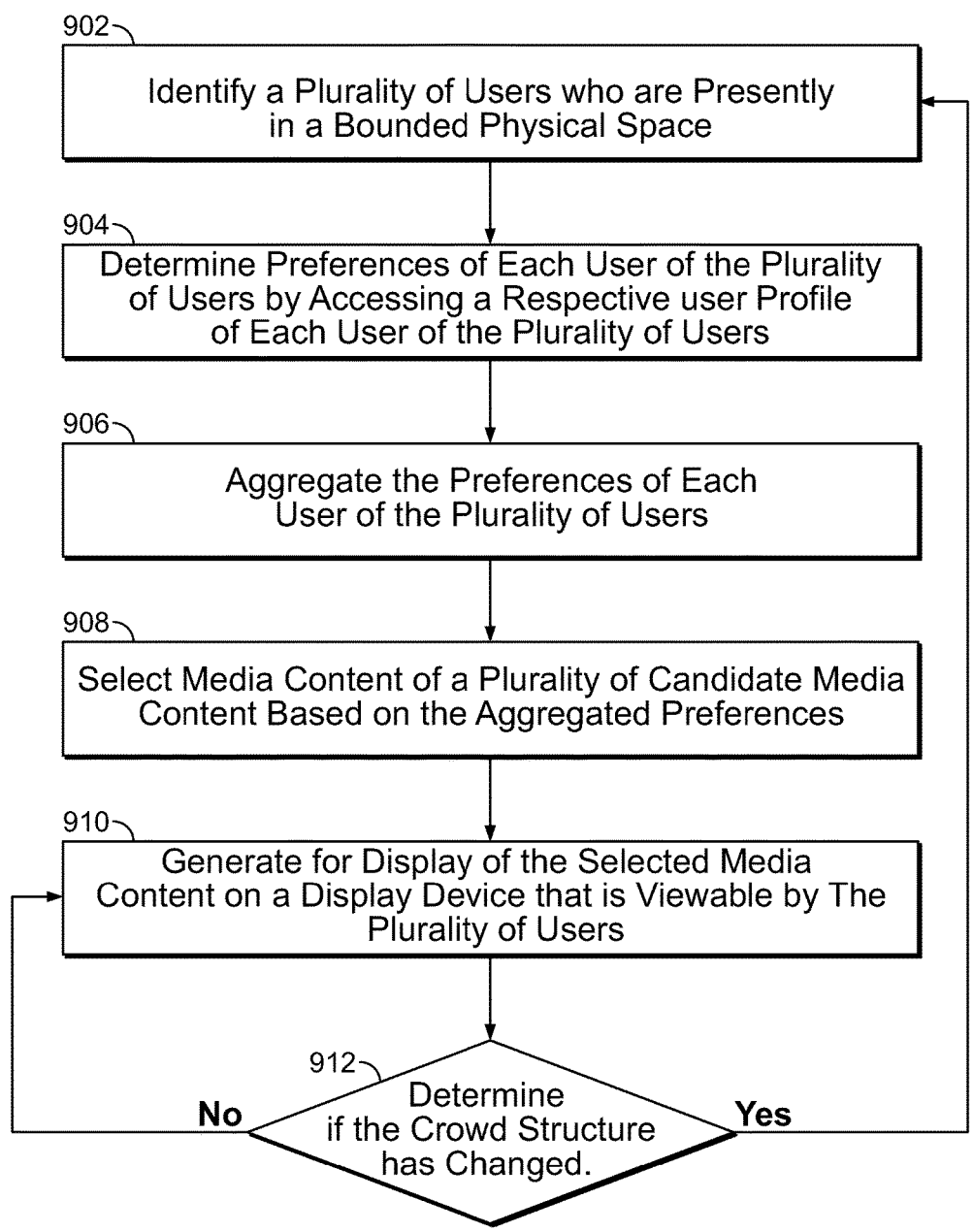
FIG. 9 shows a flowchart of illustrative steps for determining temporally popular content for display, in accordance with some embodiments of the disclosure.

FIG. 9 shows a flowchart of illustrative steps for determining temporally popular content for display, in accordance with some embodiments of the disclosure. It should be noted that process 900 or any step thereof could be performed on, or provided by, any of the devices shown in FIGS. 3-4. For example, process 700 may be executed by control circuitry 304 as instructed by a media guidance application implemented on user equipment 402, 404, and/or 406 in order to determine temporally popular content for display. In addition, one or more steps of process 900 may be incorporated into or combined with one or more steps of any other process or embodiment.

At 902, control circuitry 304 may identify a plurality of users who are presently in a bounded physical space. For example, control circuitry 304 may identify a group of users in a public square (e.g., bounded physical space 604) by tracking the GPS in the mobile phone (e.g., user equipment device 606) for each user. Process 900 proceeds to 904.

At 904, control circuitry 304 may determine preferences of each user of the plurality of users by accessing a respective user profile of each user of the plurality of users. For example, control circuitry 304 may request (e.g., via interactive display 608) that each user identified in the public square (e.g., bounded physical space 604) indicate preferences, such as requesting each user vote on which category of content is most preferred, with options for sports, fashion, and fine dining. Process 900 proceeds to 906.

At 906, control circuitry 304 may aggregate the preferences of each user of the plurality of users. For example, control circuitry 304 may determine the preferences of the group by counting the votes and determining how many users prefer sports related content, fashion related content, and food related content. Process 900 proceeds to 908.

At 908, control circuitry 304 may select media content of a plurality of candidate media content based on the aggregated preferences. For example, control circuitry 304 may select one of the candidate media content options, such as an advertisement for a sports network (e.g., ESPN) due to the fact that more users stated a preference for sports related content. Process 900 proceeds to 910.

At 910, control circuitry 304 may generate for display of the selected media content on a display device that is viewable by the plurality of users. For example, if the users are all gathered in a public square (e.g., Times Square), control device 304 will generate the display of the advertisement for a sports network (e.g., ESPN) on one of the billboards that is viewable from the public square (e.g., display device 602). Process 900 may proceed to optional 912 in some embodiments.

At 912, control circuitry 304 may determine if the crowd structure has changed. For example, control circuitry 304 may monitor the plurality of users as users enter and leave the public square (e.g., bounded physical space 604). If the crowd structure changes, process 900 proceeds to 902. Otherwise, process 900 proceeds to 910.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, recommending a display device for media consumption may be performed by processing circuitry (e.g., by processing circuitry 306 of FIG. 3). The processing circuitry, for instance, may be a general purpose processor, a customized integrated circuit (e.g., an ASIC), or a field programmable gate array (FPGA) within user equipment 300, media content source 416, or media guidance data source 418. For example, the media content preferences as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for recommending a display device of a plurality of display devices for media consumption, the method comprising:
   receiving, from a mobile device of a user, a request to view media content;
   in response to the receiving the request, determining both a location of the user and media content preferences of the user;
   identifying a plurality of display devices that are both (1) within a threshold proximity to the user, and (2) connected to a same local area network to which the mobile device of the user is connected;
   identifying a respective media asset that is presently displayed at each display device of the plurality of display devices;
   determining, based on the media content preferences of the user, a recommended physical display device of the plurality of display devices that is presently displaying media content that is likely to be preferred by the user; and
   providing the user with an identification of the recommended physical display device.

2. The method of claim 1, wherein the threshold proximity comprises at least one of a) a radial distance from the user, b) a region defined by the user, and c) a range determined by limitations of the mobile device of the user.

3. The method of claim 1, wherein the identifying of the respective media asset that is presently displayed at each display device of the plurality of display devices comprises:
   transmitting a respective request to each display device of the plurality of display devices; and
   determining, based on each respective request, the identity of each respective media asset.

4. The method of claim 1, wherein the determining of the recommended display device comprises:
   determining a respective user of each display device of the plurality of display devices;
   determining a relationship between the user and the respective user of each display device; and
   determining the recommended display device based on the relationship in addition to the media content preferences of the user.

5. The method of claim 1, wherein the determining of the recommended display device comprises:
   comparing respective metadata of each respective media asset that is displayed at each display device of the plurality of display devices to attributes of the media content preferences of the user; and determining the recommended display device to be the display device of the plurality of display devices that is currently displaying the respective media asset with, relative to each other respective media asset, the most metadata in common with the attributes of the media content preferences of the user.

6. The method of claim 1, wherein the providing of the user with the identification of the recommended display device comprises providing instructions for the user to locate the recommended display device.

7. The method of claim 1, wherein the providing of the user with the identification of the recommended display device further comprises providing an identification of the media content currently displayed.

8. The method of claim 1, wherein the providing of the user with the identification of the recommended display device further comprises providing an identification of a present user of the recommended display device and an indication of a relationship between the user and the present user.

9. The method of claim 1, further comprising providing a present user of the recommended display device with a notification that the device is recommended to the user.

10. A system for recommending a display device of a plurality of display devices for media consumption, the system comprising control circuitry configured to:
receive, from a mobile device of user, a request to view media content;
in response to the receiving the request, determine both a location of the user and media content preferences of the user;
identify a plurality of display devices that are both (1) within a threshold proximity to the user, and (2) connected to a same local area network to which the mobile device of the user is connected;
identify a respective media asset that is presently displayed at each display device of the plurality of display devices;
determine, based on the media content preferences of the user, a recommended physical display device of the plurality of display devices that is presently displaying media content that is likely to be preferred by the user; and
provide the user with an identification of the recommended physical display device.

11. The system of claim 10, wherein the threshold proximity comprises at least one of a) a radial distance from the user, b) a region defined by the user, and c) a range determined by limitations of the mobile device of the user.

12. The system of claim 10, wherein the control circuitry is further configured, with identifying the respective media asset that is presently displayed at each display device of the plurality of display devices, to:
transmit a respective request to each display device of the plurality of display devices; and
determine, based on each respective request, the identity of each respective media asset.

13. The system of claim 10, wherein the control circuitry is further configured, with determining the recommended display device, to:
determine a respective user of each display device of the plurality of display devices;
determine a relationship between the user and the respective user of each display device; and
determine the recommended display device based on the relationship in addition to the media content preferences of the user.

14. The system of claim 10, wherein the control circuitry is further configured, when determining the recommended display device, to:
compare respective metadata of each respective media asset that is displayed at each display device of the plurality of display devices to attributes of the media content preferences of the user; and
determine the recommended display device to be the display device of the plurality of display devices that is currently displaying the respective media asset with, relative to each other respective media asset, the most metadata in common with the attributes of the media content preferences of the user.

15. The system of claim 10, wherein the control circuitry is further configured, when providing the user with the identification of the recommended display device, to provide instructions for the user to locate the recommended display device.

16. The system of claim 10, wherein the control circuitry is further configured, when providing the user with the identification of the recommended display device is further configured to provide an identification of the media content currently displayed.

17. The system of claim 10, wherein the control circuitry is further configured, when providing the user with the identification of the recommended display device, to provide an identification of a present user of the recommended display device and an indication of a relationship between the user and the present user.

18. The system of claim 10, wherein the control circuitry is further configured to provide a present user of the recommended display device with a notification that the device is recommended to the user.

* * * * *